US009411219B2

(12) United States Patent
Osaka

(10) Patent No.: US 9,411,219 B2
(45) Date of Patent: Aug. 9, 2016

(54) EXCITATION LIGHT SYNTHESIZING UNIT, LIGHT SOURCE UNIT, AND PROJECTION-TYPE DISPLAY APPARATUS

(75) Inventor: Akihiro Osaka, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 110 days.

(21) Appl. No.: 14/353,002

(22) PCT Filed: Dec. 27, 2011

(86) PCT No.: PCT/JP2011/080217
§ 371 (c)(1),
(2), (4) Date: Apr. 18, 2014

(87) PCT Pub. No.: WO2013/098941
PCT Pub. Date: Jul. 4, 2013

(65) Prior Publication Data
US 2014/0253881 A1    Sep. 11, 2014

(51) Int. Cl.
*G03B 21/14* (2006.01)
*G03B 21/20* (2006.01)
(Continued)

(52) U.S. Cl.
CPC ............ *G03B 21/2073* (2013.01); *F21V 13/12* (2013.01); *G03B 21/204* (2013.01); *G03B 21/2013* (2013.01); *G03B 33/06* (2013.01); *H04N 9/3167* (2013.01)

(58) Field of Classification Search
CPC .. F21V 13/12; G03B 21/2013; G03B 21/204; G03B 21/2073; G03B 33/06; H04N 9/3167
See application file for complete search history.

(56) References Cited

U.S. PATENT DOCUMENTS

| 4,995,718 A * | 2/1991 | Jachimowicz | G02B 27/26 |
| | | | 348/E13.014 |
| 9,039,187 B2 * | 5/2015 | Katou | G02B 5/26 |
| | | | 353/30 |
| 2004/0109329 A1 * | 6/2004 | Kato | H04N 9/315 |
| | | | 362/555 |

(Continued)

FOREIGN PATENT DOCUMENTS

| JP | 2005-195780 A | 7/2005 |
| JP | 2005-345767 A | 12/2005 |

(Continued)

OTHER PUBLICATIONS

International Search Report (ISR) (PCT Form PCT/ISA/210), in PCT/JP2011/080217, dated Mar. 13, 2012.

*Primary Examiner* — Sultan Chowdhury
*Assistant Examiner* — Magda Cruz
(74) *Attorney, Agent, or Firm* — McGinn IP Law Group PLLC

(57) ABSTRACT

Provided is an excitation light synthesizing unit capable of emitting, in one direction, excitation light incident from a plurality of difference directions. The excitation light synthesizing unit includes polarization splitter film (15), first and second ¼ wavelength plates (13 and 14), and reflection member (19). Polarization splitter film (15) transmits excitation light that is P-polarized light while reflecting excitation light that is S-polarized light. First and second ¼ wavelength plates (13 and 14) are arranged on the path along which first excitation light (L1), which is directed toward polarization splitter film (15), travels. Reflection member (19) disposed between first and second ¼ wavelength plates (13 and 14). Reflection member (19) reflects second excitation light (L2) incident via polarization splitter film (15) toward polarization splitter film (15). Reflection member (19) includes hole (20) formed to pass first excitation light (L1).

10 Claims, 8 Drawing Sheets

(51) Int. Cl.
*H04N 9/31* (2006.01)
*G03B 33/06* (2006.01)
*F21V 13/12* (2006.01)

(56) References Cited

U.S. PATENT DOCUMENTS

| | | |
|---|---|---|
| 2009/0141242 A1 | 6/2009 | Silverstein et al. |
| 2009/0284148 A1 | 11/2009 | Iwanaga |
| 2010/0328632 A1* | 12/2010 | Kurosaki ............ G03B 21/204 353/98 |

FOREIGN PATENT DOCUMENTS

| | | |
|---|---|---|
| JP | 2006-154601 A | 6/2006 |
| JP | 2006-154602 A | 6/2006 |
| JP | 2007-507755 A | 3/2007 |
| JP | 2008-003125 A | 1/2008 |
| JP | 2009-277516 A | 11/2009 |
| JP | 2011-013313 A | 1/2011 |
| JP | 2011-505593 A | 2/2011 |
| WO | WO 2005/034525 A2 | 4/2005 |
| WO | WO 2009/073089 A1 | 6/2009 |

* cited by examiner (a)

(b)

(c)

(d)

EXCITATION LIGHT SYNTHESIZING UNIT, LIGHT SOURCE UNIT, AND PROJECTION-TYPE DISPLAY APPARATUS

TECHNICAL FIELD

The present invention relates to an excitation light synthesizing unit that collects a plurality of excitation lights to emit one group of excitation lights, a light source unit including the excitation light synthesizing unit, and a projection-type display apparatus including the light source unit.

BACKGROUND ART

There is known a projection-type display apparatus that projects a personal computer picture, a video image or the like to a screen. The projection-type display apparatus includes a light source device, and a display device such as a DMD (Digital Micromirror Device) or a LCD (Liquid Crystal Display) panel that modulates light. Light from the light source device is modulated by the display device, and a desired image is displayed on the screen.

The brightness of the image that is projected from the projection-type display apparatus is determined based on the brightness of the light that is emitted from the light source device disposed in the projection-type display apparatus. Accordingly, in the projection-type display apparatus, the light source device that includes a high-pressure mercury lamp capable of emitting relatively bright light has been used.

However, because the high-pressure mercury lamp contains mercury, there is a possibility that the mercury will leak and contaminate the environment when the high-pressure mercury lamp is discarded. Thus, JP2009-277516A (hereinafter, Patent Literature 1) discloses, as a light source device that does not contain any such environmental pollutants as mercury, a light source device that uses a phosphor.

The light source device that is disclosed in Patent Literature 1 includes the phosphor that is excited to emit light, and an excitation light source that emits the excitation light of a blue band to excite the phosphor. The excitation light that is emitted from the excitation light source is applied to the phosphor to excite the phosphor, and the phosphor emits light other than blue band light, such as red band light or green band light. The light source device causes the light (hereinafter, fluorescent light), which is emitted from the phosphor, to enter the display device, and the projection-type display apparatus displays an image on the screen.

The brightness of the image that is projected from the projection-type display apparatus depends on the brightness of the light that is emitted from the light source device. The brightness of the light that is emitted from the light source device that is disclosed in Patent Literature 1, namely, the brightness of the fluorescent light, depends on the amount of excitation light applied to the phosphor. Accordingly, JP2011-13313A (hereinafter, Patent Literature 2) discloses a light source device that includes a plurality of arrayed excitation light sources.

The light source device that is disclosed in Patent Literature 2 will be described referring to FIG. 1.

FIG. 1 is a schematic plan view showing the light source device that is disclosed in Patent Literature 2. As shown in FIG. 1, light source device 1 includes fluorescent wheel 2 where a phosphor layer has been formed, and a plurality of light sources 3 that emit excitation light to excite the phosphor.

The plurality of light sources 3 emits the excitation light in first direction X. Light source 3 includes collimator lens 4 for converting the excitation light, which is emitted from light source 3, into parallel light. Thus, a group of excitation lights that are emitted from light source 3 enters virtual surface A perpendicularly intersecting first direction X, and travels without spreading.

Fluorescent wheel 2 is disposed in the direction along which the excitation light that is emitted from light source 3 travels, and condenser lens group 5 is disposed between light source 3 and fluorescent wheel 2. The group of excitation lights that are emitted from light source 3 is condensed by condenser lens group 5 to be applied to the phosphor layer of fluorescent wheel 2.

The excitation light is applied to the phosphor layer of fluorescent wheel 2, and the phosphor emits fluorescent light. The fluorescent light is dispersed toward light source 3 to pass through condenser lens group 5, and is converted into parallel light within virtual surface A by condenser lens group 5, and then travels toward light source 3.

Between condenser lens group 5 and light source 3, dichroic mirror 6 that reflects the fluorescent light and that lets the excitation light pass is disposed. Accordingly, the fluorescent light that passed through condenser lens group 5 is reflected at dichroic mirror 6 and travels in reflection direction R that intersects first direction X. The fluorescent light that is reflected at dichroic mirror 6 enters virtual surface B perpendicularly intersecting reflection direction R, and then exits from light source device 1 to the outside.

It is known that lights condensable on the display device among lights that are emitted from the light source device are correlated based on Etendue that is one of characteristics of an optical system. When the Etendue of a light source side optical system including the light source device and the Etendue of a projection side optical system including the display device do not satisfy predetermined conditions, the brightness of the light that is emitted from the light source device is not sufficiently condensed on the display device. In other words, lights that are not used for modulation of the display device from among the lights that are emitted from the light source device increase, and the brightness of the image that is projected by the projection-type display apparatus becomes lower.

Conditions between the Etendue of the light source side optical system and the Etendue of the projection side optical system, that uses more of the light that is emitted from the light source device, will be described.

According to JP2005-345767A (Patent Literature 3), the Etendue of the light source side optical system including a surface light source such as a LED light source is expressed by the following formula.

$$E_{light} = \pi A_{light} \sin^2 \theta_{light} \quad \text{[Formula 1]}$$

$E_{light}$: Etendue of light source side optical system
$A_{light}$=exit area of light source device
$\theta_{light}$=maximum light-emitting angle of light source device According to JP2007-507755A (Patent Literature 4), the Etendue of the projection side optical system including the display device is expressed by the following formula.

$$E_{DM} = \frac{\pi A}{4(f/\#)^2} \quad \text{[Formula 2]}$$

$E_{DM}$=Etendue of projection side optical system
$A_{DM}$=area of display device
f/#: one measure (also referred to as F-number) of the relative aperture of the projection lens For example, when the DMD is used as a display device, if the following formula is satisfied, the display device can use the relatively great amount of light that is emitted from the light source device.

$$E_{light} \leq E_{MD} \quad \text{[Formula 3]}$$

When the LCD panel is used as a display device, if the following formula is satisfied, the display device can use the relatively great amount of light that is emitted from the light source device.

$$2E_{light} \leq E_{MD} \quad \text{[Formula 4]}$$

As can be understood from formulas 1 to 4, to use the light that is emitted from the light source device more efficiency, preferably, the exit area of the light source device should be smaller while the area of the display device should be bigger.

When the area of the display device is bigger, the outer size of the display device increases, thus the projection-type display apparatus become bigger. The display device is relatively high in price compared to the other components of the projection-type display apparatus. Accordingly, when the display device becomes bigger, the display device becomes higher in price, thereby leading to an increase in the manufacturing costs of the projection-type display apparatus. Thus, there is a request for reducing the size of the exit area of the light source device.

The exit area of light source device 1 that is disclosed in Patent Literature 2 corresponds to the area of virtual surface B, as shown in FIG. 1. The area of virtual surface B depends on the area of virtual surface A. In other words, when the number of light sources 3 increases, the area of virtual surface A is enlarged, thereby causing the size of the exit area of light source device 1 to increase. Thus, in light source device 1 that is disclosed in Patent Literature 2, the number of light sources 3 cannot be increased because of the restrictions of the exit area. The result is limited improvement in the brightness of light source device 1.

Particularly, light source 3 that emits the excitation light frequently generates heat. Consequently, when light sources 3 are arranged close to each other, the heat of light source 3 cannot be efficiently discharged, and the life of light source 3 is easily shortened. In light source device 1 that is disclosed in Patent Literature 2, there has been a greater limit on the number of light sources 3 that emits the excitation lights due to the need to form a sufficient gap between light sources 3. Thus, the inventors have invented a light source unit that emits one group of excitation lights that are formed by collecting excitation lights, which are emitted from arrayed light sources 3, within a narrower range The light source unit that is invented by the inventors will be described referring to FIGS. 2 and 3.

FIG. 2 is a perspective view showing the light source unit that is invented by the inventors. FIG. 3 is a schematic plan view showing a light source device that uses the light source unit shown in FIG. 2. Components similar to those shown in FIG. 1 will be denoted by similar reference numerals, and description thereof will be omitted.

As shown in FIGS. 2 and 3, light source unit 7 includes a plurality of light sources 3 that emit excitation light in first direction X1, and a plurality of reflection mirrors 8 disposed on the path along which the excitation light, which is emitted from light source 3, travels. Reflection mirror 8 reflects the excitation light in second direction X2 that intersects first direction X1.

Gap D1 in first direction X1 between adjacent reflection mirrors 8 is smaller than gap D2 in second direction X2 between adjacent reflection mirrors 8. Accordingly, the area of virtual surface C that perpendicularly intersects second direction X2, where an excitation light group traveling in second direction X2 enters, is smaller than that of virtual surface D where an excitation light group traveling in first direction X1 enters.

As an example, a group of excitation lights will be discussed, wherein the excitation lights are emitted from twenty four light sources 3 arrayed by 3 in a longitudinal direction (paper surface depth direction in FIG. 3) and 8 in a horizontal direction (paper surface left-and-right direction in FIG. 3), and light source 3 emits parallel light of φ5 mm. When a gap between adjacent light sources 3 is 12 mm, virtual surface D is formed into a rectangular shape where a horizontal size is about 90 mm and the longitudinal size is about 30 mm. When gap D1 in first direction X1 between adjacent reflection mirrors 8 is 5 mm, virtual surface C is formed into a rectangular shape where the horizontal (paper surface up-and-down direction in FIG. 3) size is about 40 mm and the longitudinal (paper surface depth direction in FIG. 3) size is about 30 mm Thus, light source unit 7 shown in FIGS. 2 and 3 collects the excitation lights, which are emitted from arrayed light sources 3, within the narrower range and emits them in second direction X2. Accordingly, in light source device 9 that uses light source unit 7, the number of light sources 3 can be increased without enlarging the exit area of light source device 9 as compared with light source device 1 shown in FIG. 1. As a result, the brightness of light source device 9 is improved while the exit area is maintained, and an image that is projected by the projection-type display apparatus is brighter without enlarging the display device or increasing costs.

However, reflection mirror 8 shown in FIGS. 2 and 3 can only collect the plurality of excitation lights, which are emitted into and which are output from virtual surface D directed in one direction, within virtual space C. In other words, reflection mirror 8 cannot emit the excitation lights, which enter from the plurality of different directions, in one direction, and thus the number of light sources cannot be further increased without enlarging the exit area.

CITATION LIST

Patent Literature 1: JP2009-277516A
Patent Literature 2: JP2011-13313A
Patent Literature 3: JP2005-345767A
Patent Literature 4: JP2007-507755A

SUMMARY OF INVENTION

It is therefore an exemplary object of the present invention to provide an excitation light synthesizing unit capable of emitting, in one direction, incident excitation light from a plurality of different directions.

According to an aspect of the present invention, an excitation light synthesizing unit includes a polarization splitter film, first and second ¼ wavelength plates, and reflection member. The polarization splitter film transmits excitation light that is P-polarized light while reflecting excitation light that is S-polarized light. The first and second ¼ wavelength plates are arranged on the path along which first excitation light, which is directed toward the polarization splitter film, travels. The reflection member is disposed between the first and second ¼ wavelength plates. The reflection member reflects second excitation light incident via the polarization splitter film toward the polarization splitter film while transmitting the first excitation light.

According to the excitation light synthesizing unit of the present invention, the incident excitation light from the plurality of different directions can be collected within a narrower range to be emitted in one direction.

DESCRIPTION OF EXEMPLARY EMBODIMENTS

Figure 1:
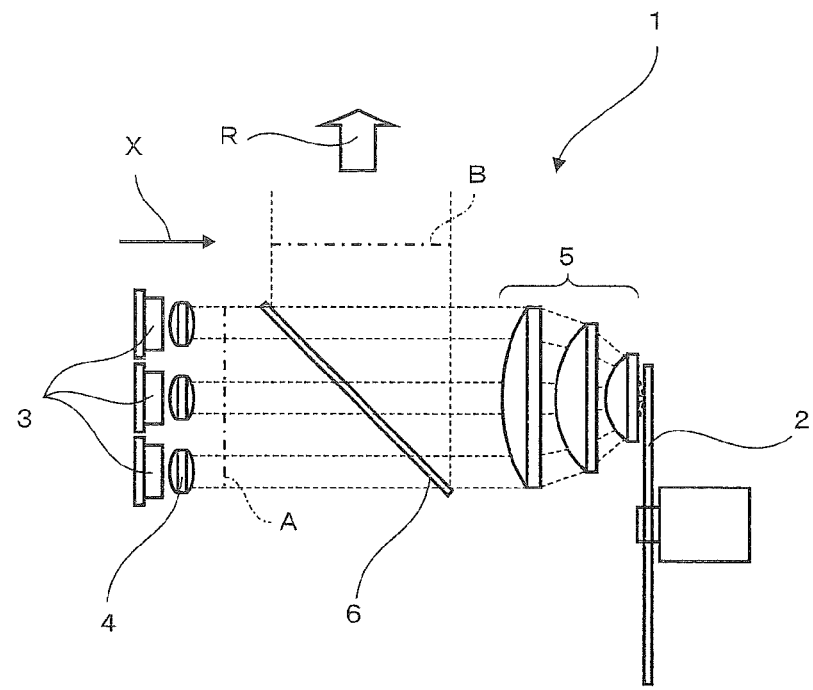
FIG. 1 is a schematic plan view showing a light source device disclosed in Patent Literature 2.
Figure 3:
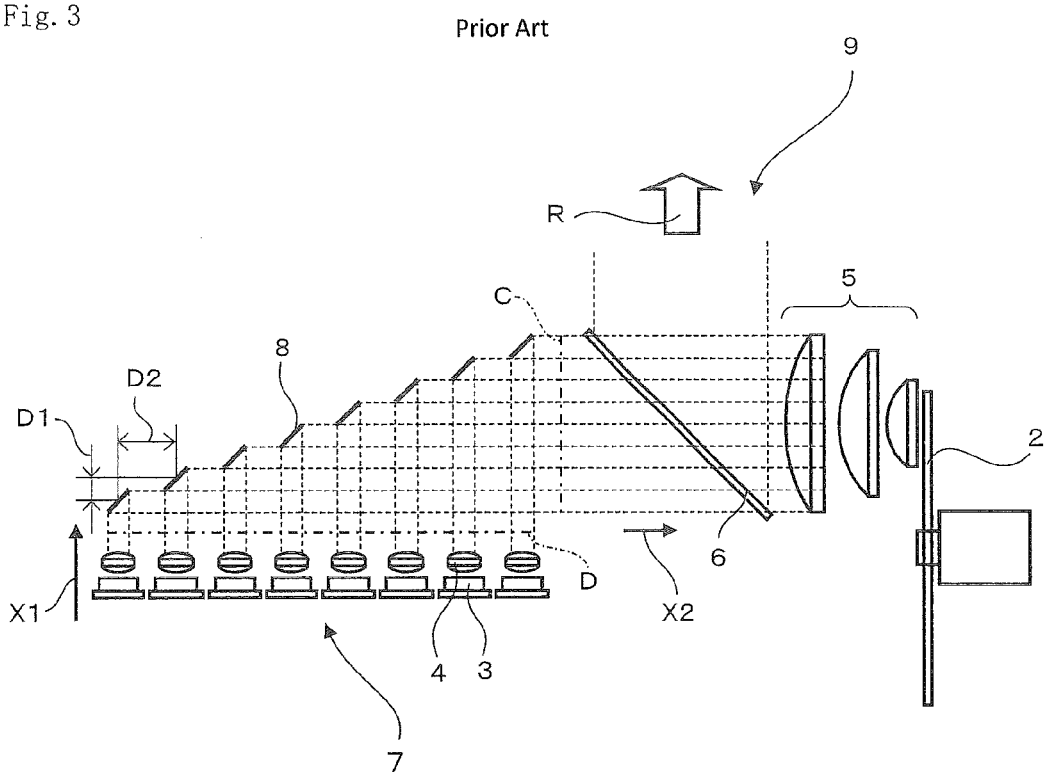
FIG. 3 is a schematic plan view showing a light source device that includes the light source unit shown in FIG. 2.

Hereinafter, the exemplary embodiments of the present invention will be described in detail with reference to the drawings. Components similar to those shown in FIGS. 1 and 3 will be denoted by similar reference numerals, and description thereof will be omitted.

First Exemplary Embodiment

Figure 4:
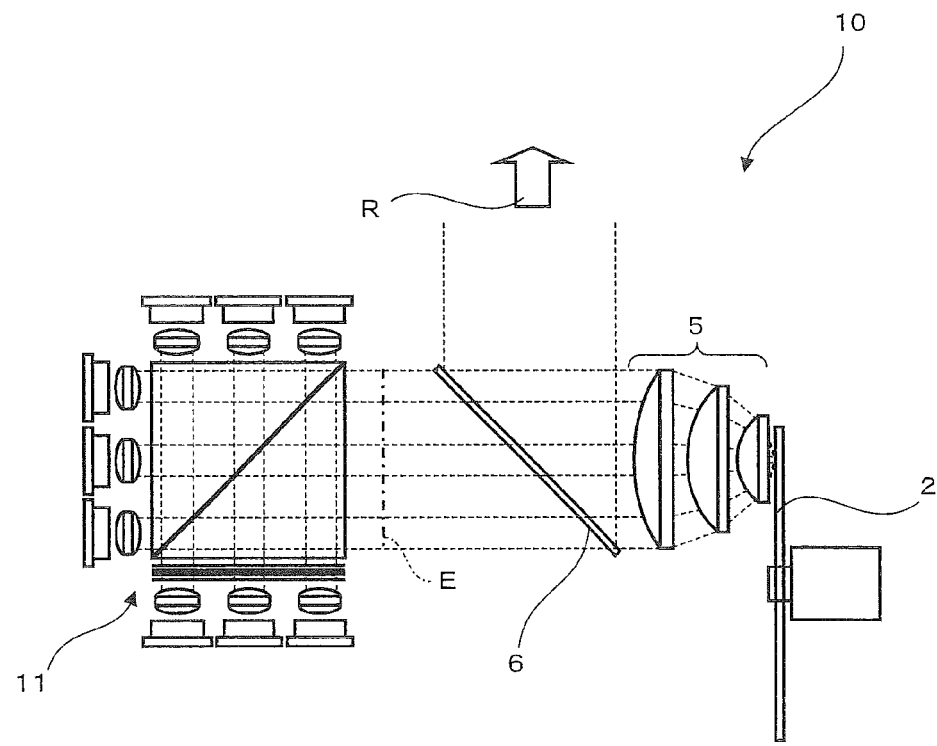
FIG. 4 is a schematic plan view showing a light source device that includes a light source unit according to the first exemplary embodiment of the present invention.

FIG. 4 is a schematic plan view showing a light source device that includes a light source unit according to the first exemplary embodiment of the present invention. As shown in FIG. 4, light source device 10 includes fluorescent wheel 2 where a phosphor layer has been formed, and light source unit 11 that emits a group of excitation lights to excite the phosphor. The group of excitation lights that are emitted from light source unit 11 travels toward fluorescent wheel 2 without spreading in a direction that intersects a traveling direction in which the group of excitation lights travels. In other words, the group of excitation light enters virtual surface E that perpendicularly intersects the traveling direction.

Between light source unit 11 and fluorescent wheel 2, condenser lens group 5 is disposed to condense the group of excitation lights that are emitted from light source unit 11. Between light source unit 11 and condenser lens group 5, dichroic mirror 6 that allows excitation light to pass through, while reflecting the fluorescent light, is disposed.

The group of excitation lights that are emitted from light source unit 11 passes through dichroic mirror 6, and is condensed by condenser lens group 5 to be applied to the phosphor of fluorescent wheel 2. The phosphor is excited by the group of excitation lights, and the phosphor emits fluorescent light.

The fluorescent light that is emitted from the phosphor of fluorescent wheel 2 spreads to travel toward light source unit 11 side. The fluorescent light is converted into parallel light within virtual surface. E by condenser lens group 5 to travel toward dichroic mirror 6. The fluorescent light, which has reached dichroic mirror 6, is reflected by dichroic mirror 6, travels in reflection direction R intersecting the direction along which the group of excitation lights that are emitted from light source unit 11 travels, and exits from light source device 10 to the outside.

Figure 5:
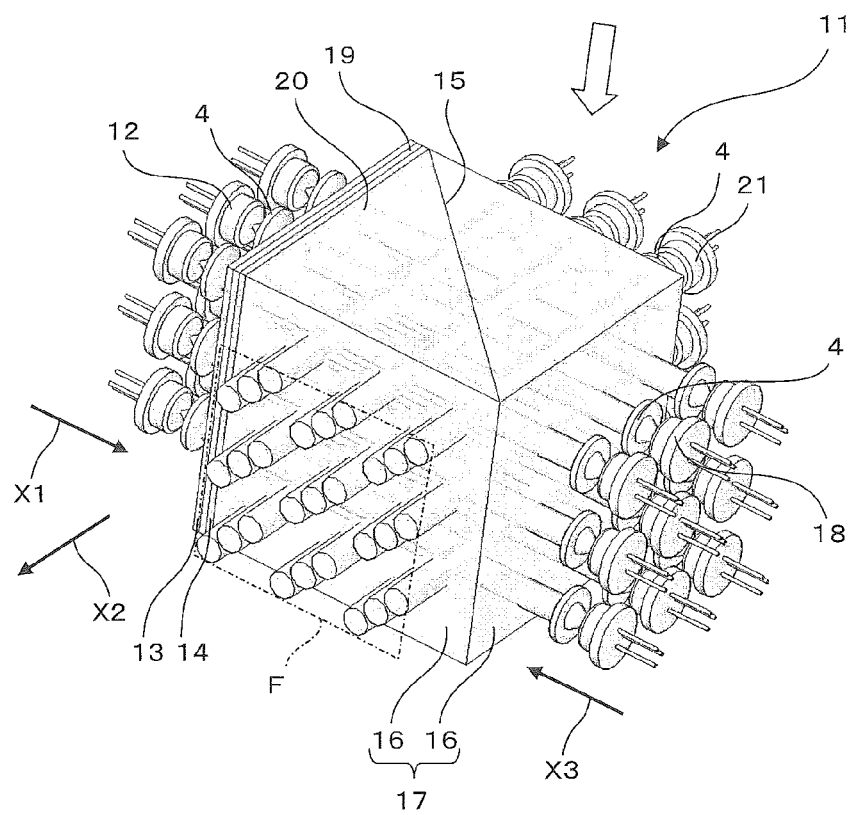
FIG. 5 is a perspective view showing the light source unit according to the first exemplary embodiment.
Figure 6:
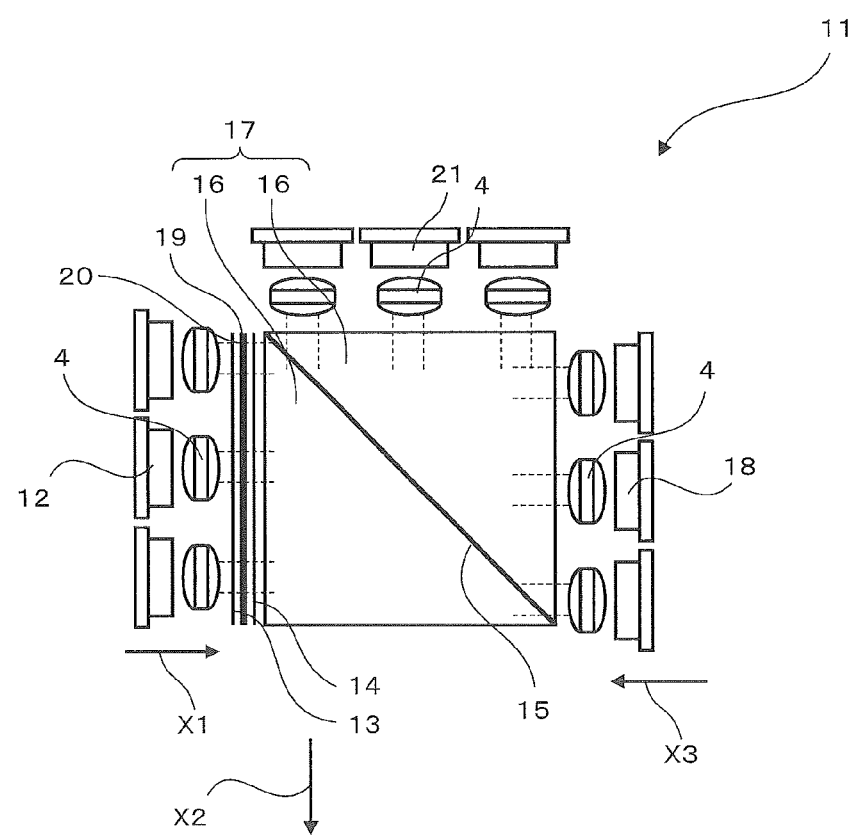
FIG. 6 is a top view showing the light source unit according to the first exemplary embodiment.

The structure of light source unit 11 will be described referring to FIGS. 5 and 6. FIG. 5 is a perspective view of light source unit 11 shown in FIG. 4. FIG. 6 is a top view when light source unit 11 shown in FIG. 5 is seen from a white arrow direction.

Figure 2:
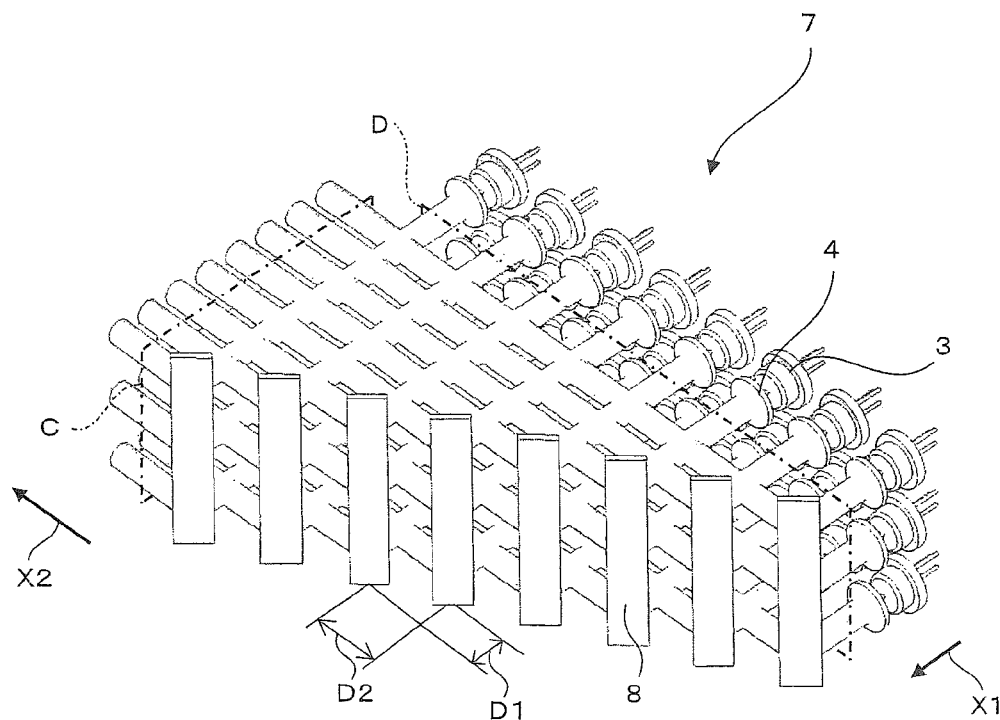
FIG. 2 is a perspective view showing a light source unit that collects excitation lights that are emitted from arrayed light sources within a narrower range to emit one excitation light group.

As shown in FIGS. 5 and 6, light source unit 11 includes first light source 12 that emits first excitation light, which excites the phosphor of fluorescent wheel 2 (FIG. 2), in first direction X1. The first excitation light is P-polarized light.

As first light source 12 that emits the excitation light that is P-polarized light and that excites the phosphor of fluorescent wheel 2 (FIG. 2), a light-emitting diode or a laser generator can be used.

First light source 12 includes collimator lens 4 that converts light emitted from a point light source into parallel light. Accordingly, when first light source 12 is a light-emitting diode, light that is emitted from the light-emitting diode is converted into parallel light by collimator lens 4. When first light source 12 is a laser generator, light that is emitted from the laser generator is converted into parallel light whose directivity is increased by collimator lens 4.

Light source unit 11 includes an excitation light synthesizing unit that outputs the first excitation light, which is emitted from first light source 12, in second direction X2 that intersects first direction X1. The excitation light synthesizing unit will be described.

The excitation light synthesizing unit includes a plurality of ¼ wavelength plates (hereinafter, simply referred to as wavelength plates) that convert P-polarized light into S-polarized light by transmitting the P-polarized light twice and S-polarized light into P-polarized light by transmitting the S-polarized light twice. First wavelength plate 13 is disposed on the path along which the first excitation light travels, and second wavelength plate 14 is disposed on the path along which the first excitation light, which passed through first wavelength plate 13, travels.

The excitation light synthesizing unit includes polarization splitter film 15 that transmits the P-polarized excitation light while reflecting the S-polarized excitation light. Polarization splitter film 15, which is disposed on the path along which the first excitation light, which passed through first and second wavelength plates 13 and 14, travels, reflects the incident S-polarized excitation light from first direction X1 into second direction X2.

In the exemplary embodiment, polarization splitter film 15 is disposed in synthesizing element 17 that is formed into a rectangular parallelepiped shape by sticking together two prisms 16 that have rectangular isosceles triangular prism shapes.

Specifically, polarization splitter film 15 is deposited on one of the opposing surfaces of two prisms 16 that adhere to each other. An adhesive is applied on the other surface, and two prisms 16 are bonded together sandwiching polarization splitter film 15. In other words, polarization splitter film 15 is formed on the section of synthesizing element 17 that passes through the gravity center and the four vertexes of synthesizing unit 17.

Light source unit 11 includes second light source 18 disposed on a side opposite first light source 12 with respect to polarization splitter film 15 to emit second excitation light. Second light source 18 emits the second excitation light in third direction X3 different from first direction X1. For example, third direction X3 is a direction opposite first direction X1.

In the exemplary embodiment, the second excitation light is P-polarized light. Second light source 18 emits the second excitation light toward second wavelength plate 14 via polarization splitter film 15.

The excitation light synthesizing unit includes reflection member 19 between first and second wavelength plates 13 and 14. Reflection member 19 reflects the second excitation light incident via polarization splitter film 15 to polarization splitter film 15 while transmitting the first excitation light. In other words, the first excitation light travels straight without being reflected by reflection member 19.

In the exemplary embodiment, reflection member 19 is a member composed of a reflection mirror that reflects the excitation light and that has a through-hole (hereinafter, hole 20) formed on the path along which the first excitation light travels.

Reflection member 19 can be a member having a region that is covered with a reflection coat for reflecting the excitation light, the region being other than the region of the outer peripheral surface of a permeable member that transmits the excitation light that is irradiated with the first excitation light. In the outer peripheral surface of the permeable member of reflection member 19, at least one surface selected from an outer peripheral surface that is irradiated with the first excitation light and an outer peripheral surface that emits the first excitation light, when the first excitation light permeates the permeable member, can be covered with an AR coat for preventing reflection of the excitation light.

Second light source 18 applies second excitation light to a region other than hole 20 of reflection member 19. The traveling direction of the second excitation light that is applied to reflection member 19 is changed by reflection member 19. The second excitation light that is reflected by reflection member 19 travels in first direction X1, and passes through second wavelength plate 14 to reach polarization splitter film 15.

Further, light source unit 11 includes third light source 21 on the same side as that of second light source 18 with respect to polarization splitter film 15. Third light source 21 emits third excitation light in second direction X2. In the exemplary embodiment, the third excitation light is P-polarized light. Accordingly, the third excitation light passes through polarization splitter film 13.

Figure 7:
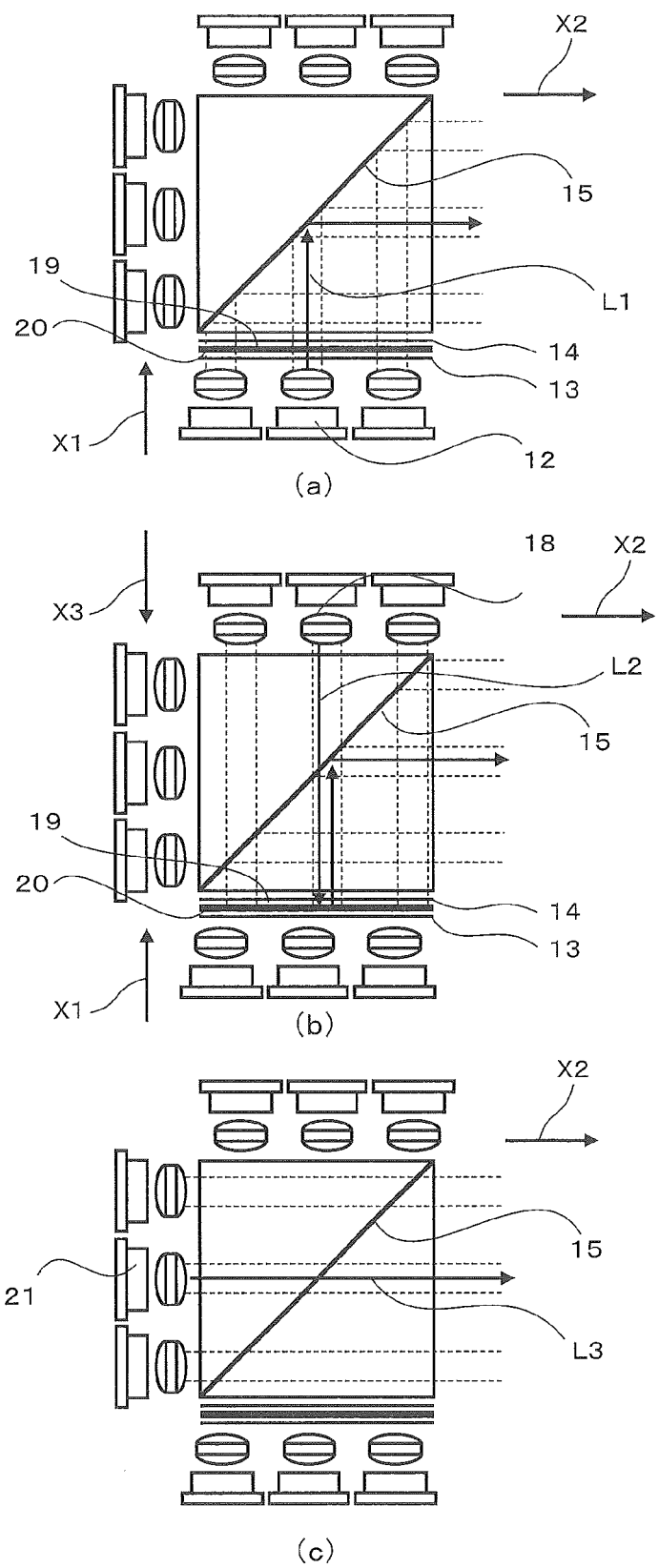
FIGS. 7A to 7C are diagrams illustrating the traveling paths of excitation lights that are emitted from first to third light sources in the light source unit according to the first exemplary embodiment.

Next, the mechanism of the excitation light synthesizing unit will be described referring to FIGS. 7A to 7C, wherein the excitation light synthesizing unit collects the first to third excitation lights that are emitted from first to third light sources 12, 18 and 21, and outputs one group of excitation lights. FIGS. 7A to 7C illustrate the paths along which the first to third excitation lights, which are emitted from first to third light sources 12, 18, and 21, travel.

First, the path along which first excitation light L1, which is emitted from first light source 12, travels will be described. As shown in FIG. 7A, first excitation light L1 that is P-polarized light is emitted from first light source 12 to travel in first direction X1, and passes through first and second wavelength plates 13 and 14 to reach polarization splitter film 15. Accordingly, first excitation light L1 is converted into S-polarized light before first excitation light L1 reaches polarization splitter film 15. First excitation light L1 is not reflected by reflection member 19 because first excitation light L1 passes through hole 20.

Because first excitation light L1, which has reached polarization splitter film 15, has been converted into S-polarized light, first excitation light L1 is reflected in second direction X2 by polarization splitter film 15. As a result, first excitation light L1 is output in second direction X2.

The path along which second excitation light L2, which is emitted from second light source 18, travels will be described. As shown in FIG. 7B, second excitation light L2 that is P-polarized light is emitted from second light source 18 to travel in third direction X3, and reaches polarization splitter film 15. Because second excitation light L2, which has reached polarization splitter film 15, is the P-polarized light, second excitation light L2 permeates polarization splitter film 15.

Second excitation light L2 that permeated polarization splitter film 15 reaches a region other than hole 20 of reflection member 19. Second excitation light L2, which has reached reflection member 19, is reflected by reflection member 19 to travel in first direction X1 to polarization splitter film 15.

Second excitation light L2 that is reflected by reflection member 19 to travel toward polarization splitter film 15 passes through second wavelength plate 14 twice before and after second excitation light L2 is reflected by reflection member 19. Accordingly, second excitation light L2, which is reflected by reflection member 19 to travel toward polarization splitter film 15, has been converted from P-polarized light into S-polarized light.

Second excitation light L2, which has reached polarization splitter film 15 after the conversion into the S-polarized light, is reflected by polarization splitter film 15. As a result, second excitation light L2 is output in second direction X2.

Lastly, the path along which third excitation light L3, which is emitted from third light source 21, travels will be described. Third excitation light L3 that is P-polarized light is emitted from third light source 21 in second direction X2, and reaches polarization splitter film 15. Because third excitation light L3, which has reached polarization splitter film 15, is the P-polarized light, third excitation light L3 permeates polarization splitter film 15. Accordingly, third excitation light L3 is output in second direction X2 without any change occurring in the traveling direction.

Thus, first to third excitation lights L1 to L3 that are emitted from first to third light sources 12, 18 and 21 are collected to be output as one group of excitation lights in second direction X2.

The traveling path of first and second excitation lights L1 and L2, incident on the excitation light synthesizing unit, is changed from the two different directions (first direction X1 and third direction X3) to be output in one direction (second direction X2). Accordingly, the excitation light synthesizing unit can emit one group of excitation lights collected within a narrower range.

Needless to say, polarization splitter film 15 can be disposed at stages in first direction X1 and second direction X2, and first and second excitation lights L1 and L2 that are reflected by polarization splitter film 15 can be collected in first direction X1.

The excitation light synthesizing unit is more advantageous when excitation lights that are emitted from light sources that are not arranged densely (laser generators including cooling members such as heat sinks) are collected.

Light source unit 11 according to the exemplary embodiment further includes third light source 21 for emitting the excitation light in second direction X2 that is different from first and third directions X1 and X3. The excitation light synthesizing unit can emit the group of excitation lights that are collected within the narrower range, because first to third excitation lights L1 to L3 incident from the three different directions are output in one direction (second direction X2).

For example, in light source unit 11 where first to third light sources, 12, 18 and 21 are each arrayed in units of 9, excitation lights that are emitted from 27 light sources are caused to enter virtual surface F perpendicularly intersecting second direction X2. The area of virtual surface F is smaller than that of a virtual surface which the excitation lights from the 27 arrayed light sources enter.

By disposing third light source 21 so that third excitation light L3 can pass through the same path as that of first and second excitation light sources L1 and L2 that are reflected by polarization splitter film 15, the excitation lights can be collected within a much narrower range.

Second Exemplary Embodiment

Next, a light source unit according to the second exemplary embodiment of the present invention will be described.

A light source device to which the light source unit according to the exemplary embodiment is applicable is similar to light source device 10 (FIG. 4) to which light source unit 11 according to the first exemplary embodiment is applicable, and thus description of the light source device will be omitted. Components similar to those of light source unit 11 according to the first exemplary embodiment will be denoted by similar reference numerals, and description thereof will be omitted.

Figure 8:
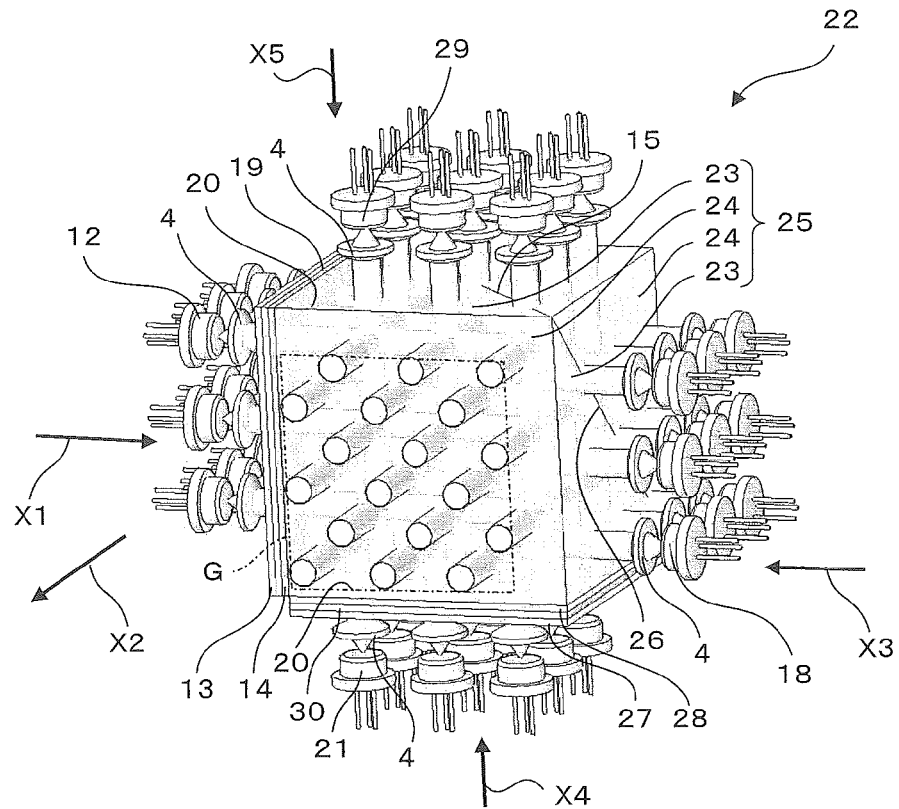
FIG. 8 is a perspective view showing a light source unit according to the second exemplary embodiment of the present invention.

FIG. 8 is a perspective view showing the light source unit according to the exemplary embodiment. As shown in FIG. 8, light source unit 22 includes first light source 12, second light source 18, and an excitation light synthesizing unit. The excitation light synthesizing unit includes first and second wavelength plates 13 and 14, polarization splitter film 15, and reflection member 19.

Polarization splitter film 15 is formed in synthesizing element 25 that is formed into a cubic shape by sticking together two prisms 23 having triangular pyramid shapes and two prisms 24 having quadrangular pyramid shapes.

Figure 9:
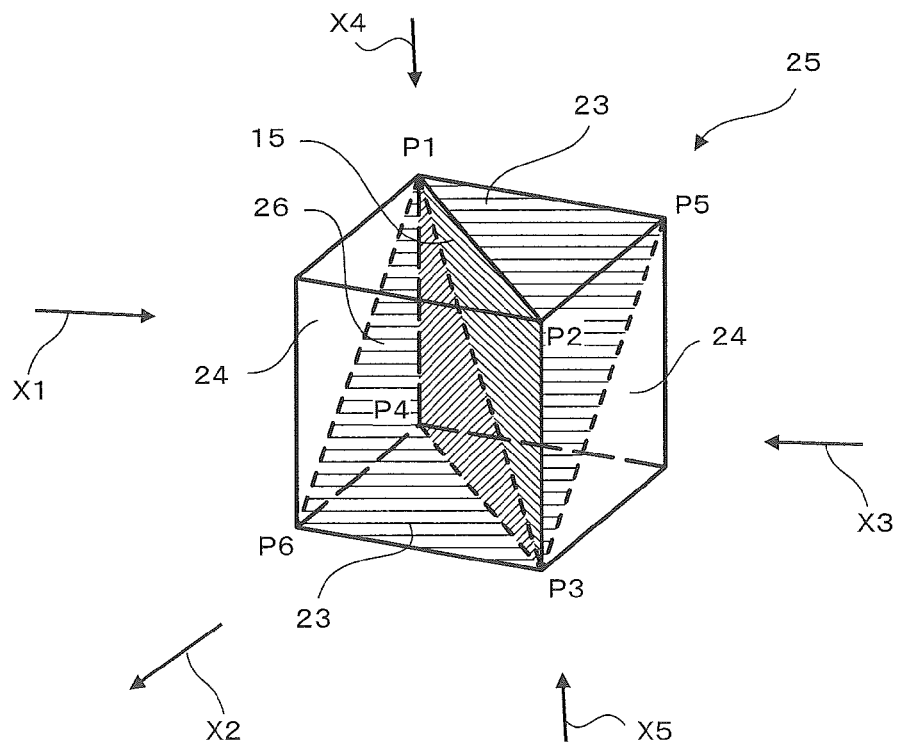
FIG. 9 is a perspective view showing a synthesizing element that is used in the light source unit according to the second exemplary embodiment.

FIG. 9 is a perspective view showing synthesizing element 25. As shown in FIG. 9, polarization splitter film 15 is formed on the section of synthesizing element 25 that passes through the gravity center and the four vertexes P1 to P4 of synthesizing element 25.

Synthesizing element 25 includes second polarization splitter film 26 inclined to intersect first polarization splitter film 15. In other words, the excitation light synthesizing unit according to the exemplary embodiment includes first polarization splitter film 15 and second polarization splitter film 26.

Second polarization splitter film 26 is formed on the section of synthesizing element 25 that passes through the gravity center and the four vertexes P1, P3, P5, and P6 of synthesizing element 25.

As shown in FIG. 8, light source unit 22 includes third light source 21 for emitting third excitation light that is S-polarized light. Third light source 21 emits the third excitation light in fourth direction X4 that intersects a virtual surface including first direction X1 and second direction X2.

The excitation light synthesizing unit includes third and fourth wavelength plates 27 and 28. Third wavelength plate 27 is disposed on the path along which the third excitation light, which is emitted from third light source 21, travels. Fourth wavelength plate 28 is disposed on the path along which the third excitation light, which passes through third wavelength plate 27, travels.

Second polarization splitter film 26 is disposed on the path along which the third excitation light, which passes through fourth wavelength plate 28, travels to reflect S-polarized incident light from fourth direction X4 in second direction X2.

Light source unit 11 includes fourth light source 29 disposed on a side opposite third light source 21 with respect to second polarization splitter film 26 to emit fourth excitation light. Fourth light source 29 emits the fourth excitation light in fifth direction X5 that is different from fourth direction X4. For example, fifth direction X5 is a direction opposite fourth direction X4.

In the exemplary embodiment, the fourth excitation light is S-polarized light. Fourth light source 29 emits the fourth excitation light toward fourth wavelength plate 28 via second polarization splitter film 26.

The excitation light synthesizing unit includes reflection member 30 between third and fourth wavelength plates 27 and 28. In other words, the excitation light synthesizing unit according to the exemplary embodiment includes first reflection member 19 and second reflection member 30.

Second reflection member 30 reflects the fourth excitation light incident via second polarization splitter film 26 to second polarization splitter film 26 while transmitting the third excitation light. In other words, the third excitation light travels straight without being reflected by second reflection member 30.

In the exemplary embodiment, second reflection member 30 is a member composed of a reflection mirror that reflects the excitation light and that has a through-hole (hereinafter, hole 20) formed on the path along which the third excitation light travels.

Second reflection member 30 can be a member having a region, which is a region other than a region that is irradiated with the third excitation light and which is covered with a reflection coat for reflecting the excitation light, of the outer peripheral surface of a permeable member that transmits the excitation light. In the outer peripheral surface of the permeable member of second reflection member 30, at least one surface selected from an outer peripheral surface that is irradiated with the third excitation light and an outer peripheral surface that emits the third excitation light, when the third excitation light permeates the permeable member, can be covered with an AR coat for preventing reflection of the excitation light.

Third light source 21 applies fourth excitation light to a region other than hole 20 that is formed in second reflection member 30. The traveling direction of the fourth excitation light that is applied to second reflection member 30 is changed by second reflection member 30. The fourth excitation light that is reflected by second reflection member 30 travels in fourth direction X4, and passes through second wavelength plate 14 to reach second polarization splitter film 26.

Next, the mechanism of the excitation light synthesizing unit will be described referring to FIG. 8 and FIGS. 10A to 10D, wherein the excitation light synthesizing unit collects the first to fourth excitation lights that are emitted from first to fourth light sources 12, 18, 21 and 29 and outputs one group of excitation lights. FIGS. 10A to 10D are perspective views of synthesizing element 25 that illustrates the paths along which the first to fourth excitation lights travel.

Figure 10:
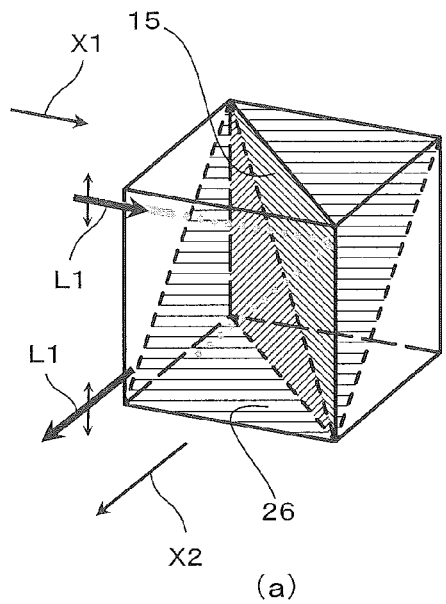
FIGS. 10A to 10D are diagrams illustrating the traveling paths of excitation lights that are emitted from first to fourth light sources in the light source unit according to the second exemplary embodiment.
Figure 10:
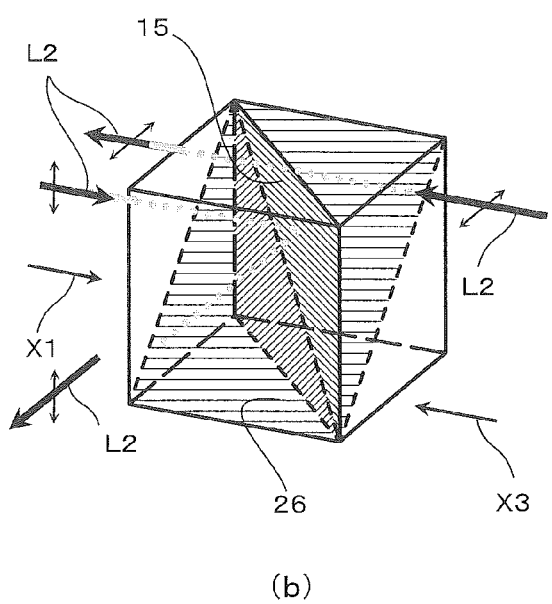
Figure 10:
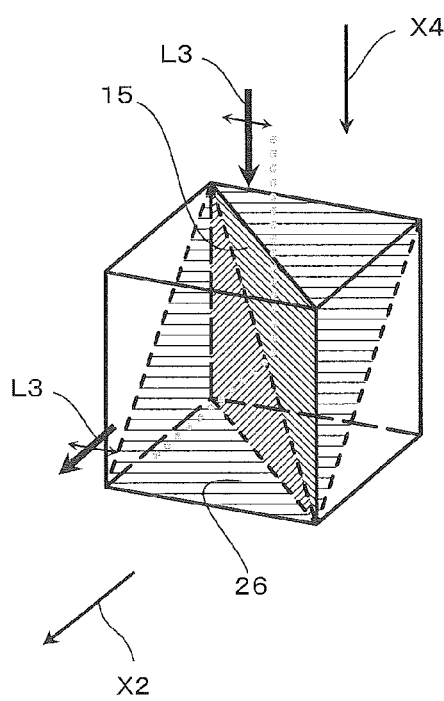
Figure 10:
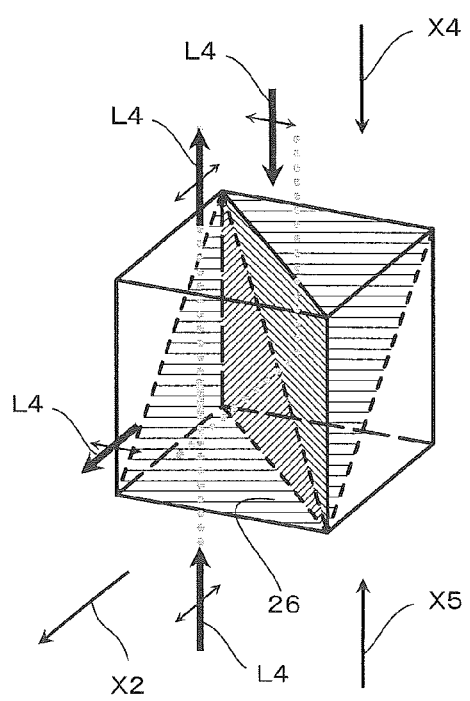

First, the path along which first excitation light L1, which is emitted from first light source 12, travels will be described. As shown in FIGS. 8 and 10A, first excitation light L1 that is P-polarized light is emitted from first light source 12 to travel in first direction X1, and passes through first and second wavelength plates 13 and 14 to reach first polarization splitter film 15. Accordingly, first excitation light L1 as P-polarized light is converted into S-polarized light before first excitation light L1 reaches first polarization splitter film 15. First excitation light L1 is not reflected by first reflection member 19 because first excitation light L1 passes through hole 20 of first reflection member 19.

Because first excitation light L1, which has reached first polarization splitter film 15, has been converted into the S-polarized light, first excitation light L1 is reflected in second direction X2 by first polarization splitter film 15. As a result, first excitation light L1 is output in second direction X2.

A part of first excitation light L1 reaches second polarization splitter film 26. First excitation light L1 is converted into S-polarized light before first excitation light L1 reaches second polarization splitter film 26. Accordingly, first excitation light L1 permeates second polarization splitter film 26. Thus, all first excitation light L2 is output in second direction X2.

The path along which second excitation light L2, which is emitted from second light source 18, travels will be described. As shown in FIGS. 8 and 10B, second excitation light L2 that is P-polarized light is emitted from second light source 18 to travel in third direction X3, and reaches first polarization splitter film 15. Because second excitation light L2, which has reached first polarization splitter film 15, is P-polarized light, second excitation light L2 permeates first polarization splitter film 15 and travels toward first reflection member 19.

Depending on an angle between second polarization splitter film 26 and third direction X3, a part of second excitation light L2 that is directed from second light source 18 to first reflection member 19 reaches second polarization splitter film 26. Because second excitation light L2, which has reached second polarization splitter film 26, is P-polarized light, second excitation light L2 is reflected by second polarization splitter film 26, and a part of second excitation light L2 may not reach first reflection member 19. To enable more of second excitation light L2 to reach first reflection member 19, second polarization splitter film 26 is preferably disposed in parallel to third direction X3.

Second excitation light L2, which has reached first reflection member 19, is reflected in first direction X1 by first reflection member 19 to travel toward first polarization splitter film 15. Second excitation light L2, which is reflected by first reflection member 19 to travel toward first polarization splitter film 15, passes through second wavelength plate 14 twice before and after second excitation light L2 is reflected by first reflection member 19. Accordingly, second excitation light L2, which is reflected by first reflection member 19 to travel toward first polarization splitter film 15, is converted from P-polarized light into S-polarized light.

Second excitation light L2, which has reached first polarization splitter film 15 after conversion into S-polarized light, is reflected in second direction X2 by first polarization splitter film 15. A part of second excitation light L2 that is reflected by first polarization splitter film 15 reaches second polarization splitter film 26. Second excitation light L2 permeates second polarization splitter film 26 because second excitation light L2 has been converted into S-polarized light. Thu, all second excitation light L2 that is reflected by first polarization splitter film 15 is output in second direction X2.

The path along which third excitation light L3, which is emitted from third light source 21, travels will be described. As shown in FIGS. 8 and 10C, third excitation light L3 that is S-polarized light is emitted from third light source 21 to travel in fourth direction X4, and passes through third and fourth wavelength plates 27 and 28 to reach second polarization splitter film 26. Thus, third excitation light L3 is converted into P-polarized light before third excitation light L3 reaches second polarization splitter film 26. Third excitation light L3 is not reflected by second reflection member 30 because third excitation light L3 passes through hole 20 of second reflection member 30.

Because third excitation light L3, which has reached second polarization splitter film 26, has been converted into the P-polarized light, third excitation light L3 is reflected in second direction X2 by second polarization splitter film 26. As a result, third excitation light L3 travels in second direction X2.

A part of third excitation light L3 reaches first polarization splitter film 15. Third excitation light L3 has been converted into P-polarized light before third excitation light L3 reaches first polarization splitter film 15. Accordingly, third excitation light L3 permeates first polarization splitter film 15. Thus, all third excitation light L3 is output in second direction X2.

Lastly, the path along which fourth excitation light L4, which is emitted from fourth light source 29, travels will be described. As shown in FIGS. 8 and 10D, fourth excitation light L4 that is S-polarized light is emitted from fourth light source 29 to travel in fifth direction X5, and reaches second polarization splitter film 26. Because fourth excitation light L4, which has reached second polarization splitter film 26, is S-polarized light, fourth excitation light L4 permeates second polarization splitter film 26 and travels toward second reflection member 30.

Depending on an angle between first polarization splitter film 15 and fifth direction X5, a part of fourth excitation light L4 that is directed from fourth light source 29 to second reflection member 30 reaches first polarization splitter film 15. Because fourth excitation light L4, which has reached first polarization splitter film 15, is S-polarized light, fourth excitation light L4 is reflected by first polarization splitter film 15 and a part of fourth excitation light L4 may not reach second reflection member 30. To enable more of fourth excitation light L4 to reach second reflection member 30, first polarization splitter film 15 is preferably disposed in parallel to fifth direction X5.

Fourth excitation light L4, which has reached second reflection member 30, is reflected in fourth direction X4 by second reflection member 30 to travel toward second polarization splitter film 26. Fourth excitation light L4, which is reflected by second reflection member 30 to travel toward second polarization splitter film 26, passes through fourth wavelength plate 28 twice before and after fourth excitation light L4 is reflected by second reflection member 30. Accordingly, fourth excitation light L4, which is reflected by second reflection member 30 to travel toward second polarization splitter film 26, has been converted from S-polarized light into P-polarized light.

Fourth excitation light L4, which has reached second polarization splitter film 26 after conversion into P-polarized light, is reflected in second direction X2 by second polarization splitter film 26. A part of fourth excitation light L4 that is reflected by second polarization splitter film 26 reaches first polarization splitter film 15. Fourth excitation light L4 permeates first polarization splitter film 15 because fourth excitation light L4 has been converted into P-polarized light. Thus, all fourth excitation light L4 is output in second direction X2.

Thus, first to fourth excitation lights L1 to L4 that are emitted from the first to third light sources and fourth light source 29 are collected to be output as one group of excitation lights in second direction X2.

First to fourth excitation lights L1 to L4 incident on the excitation light synthesizing unit from the four different directions (first, third, fourth, and fifth directions X1, X3, X4, and X5) are output in one direction (second direction X2). Accordingly, the excitation light synthesizing unit can emit one group of excitation lights that are collected within a narrower range.

Excitation light synthesizing unit 22 according to the exemplary embodiment is more advantageous when excitation lights that are emitted from light sources that cannot be arranged densely (laser generators including cooling members such as heat sinks) are collected.

For example, in light source unit 22 where first to fourth light sources, 12, 18, 21 and 29 are each arrayed in units of 9, excitation lights that are emitted from 36 light sources enter virtual surface G perpendicularly intersecting second direction X2. The area of virtual surface G is smaller than that of a virtual surface which the excitation lights from the 36 arrayed light sources enter.

Third Exemplary Embodiment

Next, a light source unit according to the third exemplary embodiment of the present invention will be described. A light source device to which the light source unit according to the exemplary embodiment is applicable is similar to light source device 10 (FIG. 4) to which light source unit 11 according to the first exemplary embodiment is applicable, and thus description of the light source device will be omitted. Components similar to those of the first and second exemplary embodiments will be denoted by similar reference numerals, and description thereof will be omitted.

Figure 11:
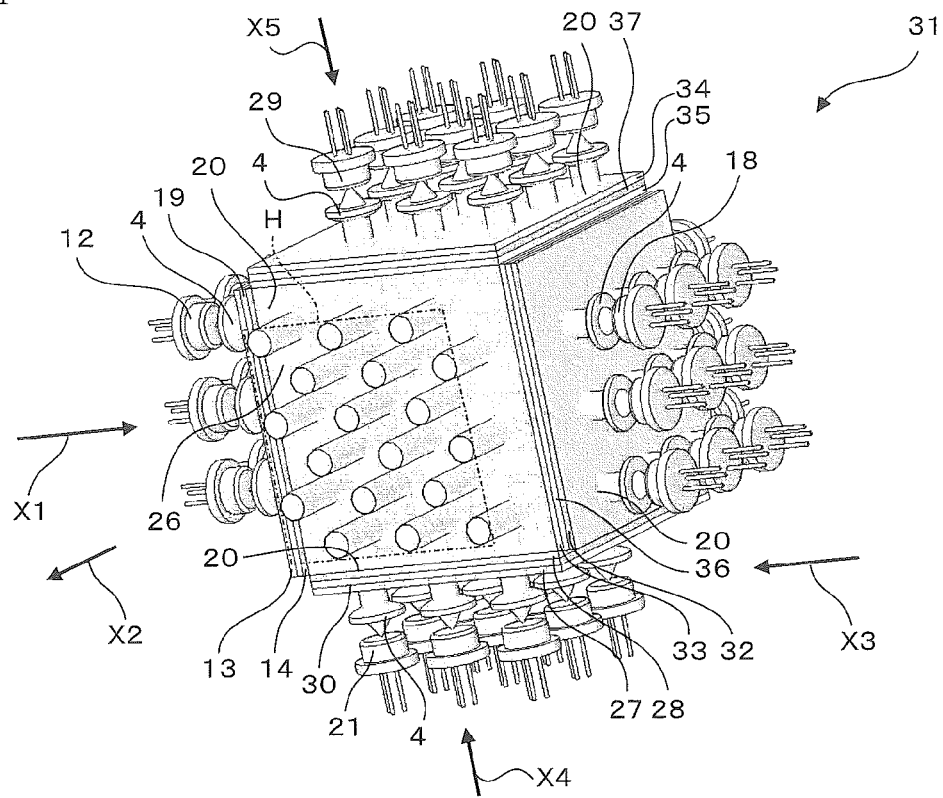
FIG. 11 is a perspective view showing a light source unit according to the third exemplary embodiment of the present invention.

FIG. 11 is a perspective view showing the light source unit according to the exemplary embodiment. As shown in FIG. 11, light source unit 31 includes first light source 12, second light source 18, third light source 21, fourth light source 29, and an excitation light synthesizing unit. The excitation light synthesizing unit includes first and second wavelength plates 13 and 14, first polarization splitter film 15, first reflection member 19, third and fourth wavelength plates 27 and 28, second polarization splitter film 26, and second reflection member 30.

A synthesizing element including first polarization splitter film 15 and second polarization splitter film 26 is similar to synthesizing element 25 according to the second exemplary embodiment (FIG. 9), and thus description thereof will be omitted.

The excitation light synthesizing unit includes fifth to eighth wavelength plates 32 to 35. Fifth wavelength plate 32 is disposed on the path along which second excitation light, which is emitted from second light source 18, travels, and sixth wavelength plate 33 is disposed on the path along which the second excitation light, which passes through fifth wavelength plate 32, travels. Seventh wavelength plate 34 is disposed on the path along which fourth excitation light, which is emitted from fourth light source 29, travels, and eighth wavelength plate 35 is disposed on the path along which the fourth excitation light, which passes through seventh wavelength plate 34, travels.

Further, the excitation light synthesizing unit includes third reflection member 36 between fifth and sixth wavelength plates 32 and 33, and fourth reflection member 37 between seventh and eighth wavelength plates 34 and 35. Second light source 18 according to the exemplary embodiment emits the second excitation light that is S-polarized light, and fourth light source 29 emits the fourth excitation light that is P-polarized light.

Third reflection member 36 reflects first excitation light incident via first polarization splitter film 15 to first polarization splitter film 15 while transmitting the second excitation light. In other words, the second excitation light travels straight without being reflected by third reflection member 36.

In the exemplary embodiment, third reflection member 36 is a member composed of a reflection mirror that reflects the excitation light and that has a through-hole (hereinafter, hole 20) formed on the path along which the second excitation light travels.

Third reflection member 36 can be a member having a region, which is the region other than a region that is irradiated with the second excitation light and which is covered with a reflection coat for reflecting the excitation light, of the outer peripheral surface of a permeable member that transmits the excitation light. In the outer peripheral surface of the permeable member of third reflection member 36, at least one surface selected from an outer peripheral surface that is irradiated with the second excitation light and an outer peripheral surface that emits the second excitation light, when the second excitation light permeates the permeable member, can be covered with an AR coat for preventing reflection of the excitation light.

Fourth reflection member 37 reflects third excitation light incident via second polarization splitter film 26 to second polarization splitter film 26 while transmitting the fourth excitation light. In other words, the third excitation light travels straight without being reflected by fourth reflection member 37.

In the exemplary embodiment, fourth reflection member 37 is a member composed of a reflection mirror that reflects the excitation light and that has a through-hole (hereinafter, hole 20) formed on the path along which the fourth excitation light travels.

Fourth reflection member 37 can be a member having a region, which is the region other than a region that is irradiated with the fourth excitation light and which is covered with a reflection coat for reflecting the excitation light, of the outer peripheral surface of a permeable member that transmits the excitation light. In the outer peripheral surface of the permeable member of fourth reflection member 37, at least one surface selected from an outer peripheral surface that is irradiated with the fourth excitation light and an outer peripheral surface that emits the fourth excitation light, when the fourth excitation light permeates the permeable member can be covered with an AR coat for preventing reflection of the excitation light.

Figure 12:
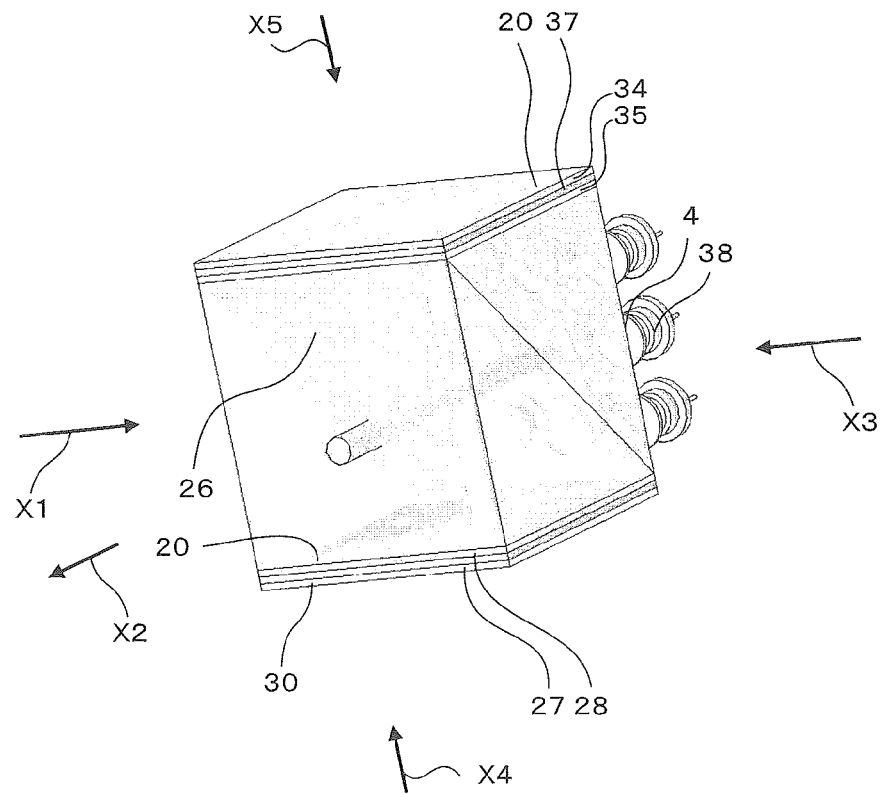
FIG. 12 is a perspective view showing a state where first to fourth light sources, first and second wavelength plates, first reflection member, fifth and sixth wavelength plates, and third reflection member are removed from the light source unit shown in FIG. 11.

FIG. 12 is a perspective view showing a state where first to fourth light sources 12, 18, 21 and 29, first and second wavelength plates 13 and 14, first reflection member 19, fifth and sixth wavelength plates 32 and 33, and third reflection member 35 are removed from light source unit 31 shown in FIG. 11. As shown in FIG. 12, light source unit 31 includes fifth light source 38 for emitting fifth excitation light in second direction X2. In the exemplary embodiment, third light source 21 emits fifth or sixth excitation light that is P-polarized or S-polarized light.

Next, the mechanism of the excitation light synthesizing unit will be described referring to FIG. 11 and FIGS. 13A to 13C, wherein the excitation light synthesizing unit collects the excitation lights that are emitted from first to fifth light sources 12, 18, 21, 29 and 38, and outputs one group of excitation lights. The paths along which the excitation lights, which are emitted from first light source 12 and third light source 21, travel are similar to those of light source unit 22 according to the second exemplary embodiment, and thus description thereof will be omitted.

Figure 13:
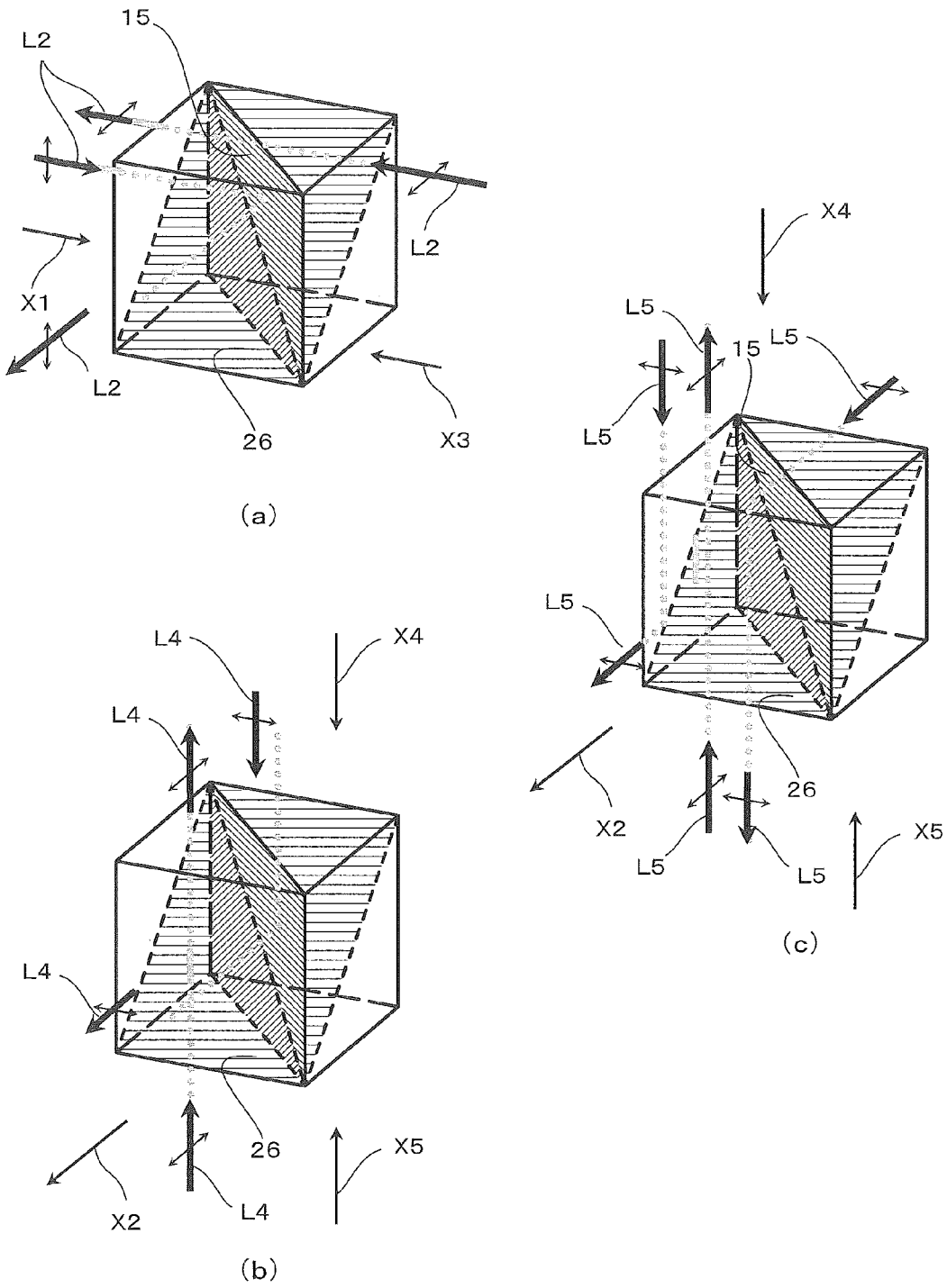
FIGS. 13A to 13C are diagrams illustrating the traveling paths of excitation lights that are emitted from the second, fourth, and fifth light sources in the light source unit according to the third exemplary embodiment.

FIGS. 13A to 13C are views illustrating the traveling paths of the excitation lights that are emitted from second, fourth, and fifth light sources 18, 29, and 38.

First, the path along which second excitation light L2, which is emitted from second light source 18, travels will be described. As shown in FIGS. 11 and 13A, second excitation light L2 that is S-polarized light is emitted from second light source 18 to travel in third direction X3, and passes through fifth and sixth wavelength plates 32 and 33 to reach first polarization splitter film 15. Accordingly, second excitation light L2 is converted into P-polarized light before second excitation light L2 reaches first polarization splitter film 15. Second excitation light L2 is not reflected by third reflection member 35 because second excitation light L2 passes through hole 20 of third reflection member 35.

Because second excitation light L2, which has reached first polarization splitter film 15, has been converted into P-polarized light, second excitation light L2 permeates first polarization splitter film 15 to travel toward first reflection member 19. The subsequent path along which second excitation light L2 travels is similar to that of second excitation light L2 according to the second exemplary embodiment, and thus description thereof will be omitted. Thus, all second excitation light L2 is output in second direction X2.

The path along which fourth excitation light L4, which is emitted from fourth light source 29, travels will be described. As shown in FIGS. 11 and 13B, fourth excitation light L4 is emitted from fourth light source 29, and passes through seventh and eighth wavelength plates 34 and 35 to reach second polarization splitter film 26. Accordingly, fourth excitation light L4 as P-polarized light is converted into S-polarized light before fourth excitation light L4 reaches second polarization splitter film 26. Fourth excitation light L4 is not reflected by fourth reflection member 37 because fourth excitation light L4 passes through hole 20 of fourth reflection member 37.

Because fourth excitation light L4, which has reached second polarization splitter film 26, has been converted into S-polarized light, fourth excitation light L4 permeates second polarization splitter film 26 to travel toward second reflection member 26. The subsequent path along which fourth excitation light L4 travels is similar to that of fourth excitation light L4 according to the second exemplary embodiment, and thus description thereof will be omitted. Thus, all fourth excitation light L4 is output in second direction X2.

Lastly, the path along which the fifth or sixth excitation light, which is emitted from fifth light source 38, travels will be described. The excitation light that is emitted from fifth light source 38 will be described as fifth excitation light L5 that is P-polarized light.

As shown in FIGS. 12 and 13C, fifth excitation light L5 that is emitted from fifth light source 38 reaches first polarization splitter film 15 or second polarization splitter film 26. A part of fifth excitation light L5 that is emitted from fifth light source 38, which has reached first polarization splitter film 15, will be described.

Because fifth excitation light L5, which has reached first polarization splitter film 15, is P-polarized light, fifth excitation light L5 permeates polarization splitter film 15 and reaches second polarization splitter film 26. Because fifth excitation light L5, which has reached second polarization splitter film 26, is P-polarized light, fifth excitation light L5 is reflected in fourth direction X4 by second polarization splitter film 26 and reaches fourth reflection member 37. Fifth excitation light L5, which has reached fourth reflection member 37, is reflected in fifth direction X5 by fourth reflection member 37 to travel toward second polarization splitter film 26.

Fifth excitation light L5 that is reflected by fourth reflection member 37 to travel toward second polarization splitter film 26 passes through eighth reflection plate 35 twice before and after fifth excitation light L5 is reflected by fourth reflection member 37. Accordingly, fifth excitation light L5, which is reflected by fourth reflection member 37 to travel toward second polarization splitter film 26, has been converted from P-polarized light into S-polarized light.

Fifth excitation light L5, which has reached second polarization splitter film 26 after the conversion into the S-polarized light, permeates second polarization splitter film 26 to reach second reflection member 30. Fifth excitation light L5, which has reached second reflection member 30, is reflected in fourth direction X5 by second reflection member 30 to travel toward second polarization splitter film 26.

Fifth excitation light L5 that is reflected by second reflection member 30 to travel toward second polarization splitter film 26 passes through fourth wavelength plate 127 twice before and after fifth excitation light L5 is reflected by second reflection member 30. Accordingly, fifth excitation light L5, which is reflected by second reflection member 30 to travel toward second polarization splitter film 26, has been converted from S-polarized light into P-polarized light.

Because fifth excitation light L5, which has been reflected by second reflection member 30, has been converted into P-polarized light, fifth excitation light L5 is reflected in second direction X2 by second polarization splitter film 26 and is output in second direction X2.

The part of fifth excitation light L5 that is emitted from fifth light source 38, which has first reached first polarization splitter film 15, has been described. The part of fifth excitation light L5 that has first reached second polarization splitter film 26 is also output, by reflection at fourth reflection member 37 and second reflection member 30, in second direction X2 while being changed from P-polarized light into S-polarized light or from S-polarized light into P-polarized light.

When the excitation light that is emitted from fifth light source 38 is the sixth excitation light that is S-polarized light, the excitation light is output, by reflection at third reflection member 36 and first reflection member 19, in second direction X2 while being changed from P-polarized light into S-polarized light or from S-polarized light into P-polarized light.

Thus, the excitation lights that are emitted from the first to fifth light sources 12, 18, 21, 29 and 38 are collected to be output as one group of excitation lights in second direction X2.

The excitation lights incident on the excitation light synthesizing unit from the five different directions (first to fifth directions X1 to X5) are output in one direction (second direction X2). Accordingly, the excitation light synthesizing unit can emit one group of excitation lights that are collected within a narrower range.

For example, in light source unit 31 where first to fifth light sources, 12, 18, 21, 29 and 38 are each arrayed in units of 9, excitation lights that are emitted from 45 light sources enter virtual surface H that perpendicularly intersects second direction X2. The area of virtual surface H is smaller than that of a virtual surface which the excitation lights from the 45 arrayed light sources enter.

The exemplary embodiments of the present invention have been described. However, the present invention is not limited to the exemplary embodiments. Various changes understandable to those skilled in the art can be made to the configuration and the specifics of the present invention within the technical idea of the invention.

REFERENCE NUMERALS

10 Light source device
11 Light source unit
12 First light source
13 First wavelength plate
14 Second wavelength plate
15 First polarization splitter film
18 Second light source
19 First reflection member
20 Hole
21 Third light source
22 Light source unit
26 Second polarization splitter film
27 Third wavelength plate
28 Fourth wavelength plate
29 Third light source
30 Second reflection member
31 Light source unit
32 Fifth wavelength plate
33 Sixth wavelength plate
34 Seventh wavelength plate
35 Eighth wavelength plate
36 Third reflection member
37 Fourth reflection member
38 Fifth light source

What is claimed is:

1. An excitation light synthesizing unit comprising:
a first polarization splitter film transmitting excitation light that comprises P-polarized light while reflecting excitation light that comprises S-polarized light;
first and second ¼ wavelength plates arranged on a path along which first excitation light, which is directed toward the first polarization splitter film, travels;
a first reflection member disposed between the first and second ¼ wavelength plates, the first reflection member reflecting second excitation light incident via the first polarization splitter film toward the first polarization splitter film while transmitting the first excitation light;
a second polarization splitter film inclined with respect to the first polarization splitter film and transmitting the excitation light that comprises S-polarized light while reflecting the excitation light that comprises P-polarized light;
third and fourth ¼ wavelength plates arranged on a path along which third excitation light, which is directed toward the second polarization splitter film, travels; and
a second reflection member disposed between the third and fourth ¼ wavelength plates, the second reflection member reflecting fourth excitation light incident via the second polarization splitter film toward the second polarization splitter film while transmitting the third excitation light.

2. The excitation light synthesizing unit according to claim 1, wherein the first and second reflection members comprise reflection mirrors that reflect the excitation light and that have holes piercing the reflection mirrors on the path along which the first or second excitation light travels.

3. The excitation light synthesizing unit according to claim 1, wherein the first and second reflection members comprise members having regions covered with reflection coats that reflect the excitation light, the regions being other than a region of an outer peripheral surface of a permeable member transmitting the excitation light irradiated with the first or third excitation light.

4. The excitation light synthesizing unit according to claim 3, wherein:
at least one surface selected from an outer peripheral surface of the permeable member irradiated with the first excitation light and an outer peripheral surface of the permeable member that emits the first excitation light, when the first excitation light permeates the permeable member of the first reflection member, is covered with an anti-reflective (AR) coat that prevents reflection of the excitation light; and
at least one surface selected from an outer peripheral surface of the permeable member irradiated with the third excitation light and an outer peripheral surface of the permeable member that emits the third excitation light, when the third excitation light permeates the permeable member of the second reflection member, is covered with an AR coat that prevents reflection of the excitation light.

5. A light source unit comprising:
the excitation light synthesizing unit according to claim 1;
a first light source that emits the first excitation light that comprises P-polarized light;
a second light source that emits the second excitation light that comprises P-polarized light;
a third light source that emits the third excitation light that comprises S-polarized light; and
a fourth light source that emits the fourth excitation light that comprises S-polarized light.

6. The excitation light synthesizing unit according to claim 1, further comprising:
fifth and sixth ¼ wavelength plates arranged on a path along which fifth excitation light, which travels in a direction different from directions in which the first and second excitation lights travel and which is reflected by the first polarization splitter film, travels;
a third reflection member disposed between the fifth and sixth ¼ wavelength plates, the third reflection member reflecting the fifth excitation light to the first reflection member via the first polarization splitter film while transmitting the second excitation light;
seventh and eighth ¼ wavelength plates arranged on a path along which sixth excitation light, which travels in a direction different from directions in which the third and fourth excitation lights travel and which is reflected by the second polarization splitter film, travels; and
a fourth reflection member disposed between the seventh and eighth ¼ wavelength plates, the fourth reflection reflecting the sixth excitation light to the second reflection member via the second polarization splitter film while transmitting the fourth excitation light.

7. The excitation light synthesizing unit according to claim 6, wherein the first to fourth reflection members comprise reflection mirrors that reflect the excitation light and that have holes piercing the reflection mirrors on the path along which the first, third, second or fourth excitation light travels.

8. The excitation light synthesizing unit according to claim 6, wherein the first to fourth reflection members comprise members each having a region, which comprises a region other than a region that is irradiated with the first, third, second or fourth excitation light and which is covered with reflection coats reflecting the excitation light, of an outer peripheral surface of a permeable member transmitting the excitation light.

9. The excitation light synthesizing unit according to claim 8, wherein:
- at least one surface selected from an outer peripheral surface of the permeable member irradiated with the first excitation light and an outer peripheral surface of the permeable member that emits the first excitation light, when the first excitation light permeates the permeable member of the first reflection member, is covered with an AR coat that prevents reflection of the excitation light;
- at least one surface selected from an outer peripheral surface of the permeable member irradiated with the third excitation light and an outer peripheral surface of the permeable member that emits the third excitation light, when the third excitation light permeates the permeable member of the second reflection member, is covered with an AR coat that prevents reflection of the excitation light;
- at least one surface selected from an outer peripheral surface of the permeable member irradiated with the second excitation light and an outer peripheral surface of the permeable member that emits the second excitation light, when the second excitation light permeates the permeable member of the third reflection member, is covered with an AR coat that prevents reflection of the excitation light; and
- at least one surface selected from an outer peripheral surface of the permeable member irradiated with the fourth excitation light and an outer peripheral surface of the permeable member that emits the fourth excitation light, when the fourth excitation light permeates the permeable member of the fourth reflection member, is covered with an AR coat that prevents reflection of the excitation light.

10. A light source unit comprising:

the excitation light synthesizing unit according to claim 6;

a first light source that emits the first excitation light that comprises P-polarized light;

a second light source that emits the second excitation light that comprises S-polarized light;

a third light source that emits the third excitation light that comprises S-polarized light;

a fourth light source that emits the fourth excitation light that comprises P-polarized light; and a fifth light source that emits the fifth excitation light that comprises S-polarized light or the sixth excitation light that comprises P-polarized light.

* * * * *